(12) United States Patent
Green et al.

(10) Patent No.: US 9,588,232 B2
(45) Date of Patent: Mar. 7, 2017

(54) METHOD AND APPARATUS FOR IMAGING OF RADIATION SOURCES

(71) Applicant: Lightpoint Medical Ltd., Chesham (GB)

(72) Inventors: Alan Green, Harston (GB); Vyas Kunal, Harston (GB); David Tuch, Rickmansworth (GB)

(73) Assignee: LIGHTPOINT MEDICAL LTD., Chesham (GB)

( * ) Notice: Subject to any disclaimer, the term of this patent is extended or adjusted under 35 U.S.C. 154(b) by 0 days.

(21) Appl. No.: 14/872,795

(22) Filed: Oct. 1, 2015

(65) Prior Publication Data

US 2016/0097863 A1    Apr. 7, 2016

(30) Foreign Application Priority Data

Oct. 2, 2014 (GB) .................................. 1417449.4

(51) Int. Cl.
  *G01T 1/20*    (2006.01)
  *G01T 1/161*   (2006.01)
  *G01T 1/36*    (2006.01)

(52) U.S. Cl.
  CPC ............ *G01T 1/2002* (2013.01); *G01T 1/161* (2013.01); *G01T 1/201* (2013.01); *G01T 1/2018* (2013.01); *G01T 1/362* (2013.01)

(58) Field of Classification Search
  CPC  G01T 1/20; G01T 1/202; G01T 1/362; G01T 1/201; G01T 1/2018; G01T 1/2002; G01T 1/1612; G01T 1/161
  See application file for complete search history.

(56) References Cited

U.S. PATENT DOCUMENTS

| 5,905,262 A | 5/1999 | Spanswick |
| 6,137,860 A * | 10/2000 | Ellegood ................. B24B 7/005 228/104 |

(Continued)

FOREIGN PATENT DOCUMENTS

| EP | 0608101 A2 | 7/1994 |
| EP | 2521157 A1 | 11/2012 |

(Continued)

OTHER PUBLICATIONS

Search Report issued May 18, 2015 in connection with GB1417449.4.

(Continued)

*Primary Examiner* — David Porta
*Assistant Examiner* — Faye Boosalis
(74) *Attorney, Agent, or Firm* — Foley & Lardner LLP; Mark J. Danielson

(57) ABSTRACT

A fiberscope comprises a scintillator arranged to produce light of a first wavelength upon exposure to radiation; an optical system arranged to receive and direct light of the first wavelength emitted from the scintillator, the light being received at one end of the optical system, and wherein one or more elements of the optical system emits scintillation light of a second wavelength upon exposure to radiation; and an optical filter, disposed at the other end of the optical system, and arranged to transmit light of the first wavelength and block light of the second wavelength. The scintillator is chosen such that the light of the first wavelength is spectrally distinct from the light of the second wavelength.

38 Claims, 5 Drawing Sheets

(56) References Cited

U.S. PATENT DOCUMENTS

2009/0236510 A1   9/2009   Lacroix et al.
2010/0069749 A1   3/2010   Lu et al.

FOREIGN PATENT DOCUMENTS

| GB | 2375170 A | 11/2002 |
|----|-----------|---------|
| JP | 2001-056381 A | 2/2001 |
| WO | WO-2007/085060 A1 | 8/2007 |
| WO | WO-2014/020359 | 2/2014 |

OTHER PUBLICATIONS

European Search Report for EP Patent Application No. 15187496.3, mailed Jun. 23, 2016, 10 pages.
Kim et al., "A Performance Optimized Optical Fiber Bio-Probe for the Cancerous Tissue Characterization", SPIE, vol. 5589, Dec. 14, 2004, 6 pages.

* cited by examiner

METHOD AND APPARATUS FOR IMAGING OF RADIATION SOURCES

CROSS-REFERENCE TO RELATED APPLICATIONS

The present application claims priority to UK Patent Application No. 1417449.4 filed Oct. 2, 2014, the contents of which are incorporated by reference herein in their entirety.

TECHNICAL FIELD

The present invention relates to the field of radiation imaging. In particular, the present invention relates to a method and apparatus for discrimination between radiation of interest and background noise.

BACKGROUND TO THE INVENTION AND PRIOR ART

Imaging of radiation has applications ranging from medical imaging to geophysical mapping. It is often desirable to image a radioactive source using a fibre optic camera. Imaging with a fibre optic camera allows the imaging device to be more compact, flexible and easier to handle, and allows the signal to be relayed to a shielded high-performance camera. However, the use of fibre optics in proximity to a radiation source creates noise artefacts due to the radiation interacting with the glass in the fibre optics, in particular scintillation, Bremsstrahlung and Cerenkov radiation. When imaging weak sources of radiation, these noise artefacts can completely obscure the signal of interest.

One common source of radiation is diagnostic radiopharmaceuticals used for medical imaging, such as Flurodeoxyglucose ($[^{18}F]$-FDG). A sample containing $[^{18}F]$-FDG emits beta+ particles (positrons) that subsequently annihilate with electrons to produce 511 keV gamma particles. In the above example, discriminating beta particles from the large gamma ray background is exceedingly difficult. The ability to accurately detect and image fluorine-18 beta particles would allow for greatly improved disease detection and treatment.

Typically, radiation is detected with the use of a material which is design to emit photons when excited by ionising radiation. Such a material is known as a 'scintillator'. A scintillator produces a signal which is (statistically) proportional to the energy absorbed from the incident radiation. Therefore, as the absorbed energy increases, more photons are produced.

Scintillators are normally combined with an optical detector capable of converting photons into electrons. Suitable devices include silicon photomultipliers, photomultiplier tubes and charge coupled devices (CCD).

Known methods of discriminating between different types of scintillation rely on pulse discrimination. The signal produced by the group of photons emitted from a single ionised particle/scintillator interaction is known as a 'pulse'. Two components of the pulse measured by a detector are commonly measured, the 'pulse-height' and the 'pulse-shape'. Energy differences between ionising particles gives rise to characteristic pulse-heights and pulse shapes.

One disadvantage with these methods however is that, as the radiation flux increases, the number of pulses produced per second increases, which reduces the average time between each such pulse. If the temporal resolution of the detector is insufficient to capture individual pulses, it can be impossible to discriminate between interaction events.

In order to mitigate against this problem scintillators with very fast temporal responses, and which have a very low after-glow, are used. Alternatively, the number of pixels of the optical detector can be increased, which reduces the number of pulses received at any given pixel per second. Both of these solutions are however not ideally suited for weak radioactive sources, as they tend to have poor optical characteristics and/or increased read noise.

Furthermore, intensive data processing is required to attempt to improve the signal/noise ratio; such attempts usually provide little gain. For these reasons practical devices for medical use have not been forthcoming.

Therefore, there exists a need to improve the detection of radiation. In particular, there exists a need for a practical detector capable of discriminating the signal from a weak form of radiation from within a relatively strong noise background. Such improvements to beta particle imaging would allow for a practical hand-held molecular imaging device.

SUMMARY OF THE INVENTION

In a first aspect, there is a fibrescope comprising, a scintillator arranged to produce light of a first wavelength upon exposure to radiation; an optical system arranged to receive and direct light of the first wavelength emitted from the scintillator, the light being received at one end of the optical system, and wherein one or more elements of the optical system emits scintillation light of a second wavelength upon exposure to radiation; and an optical filter, disposed at the other end of the optical system, and arranged to transmit light of the first wavelength and block light of the second wavelength; wherein, the scintillator is chosen such that the light of the first wavelength is spectrally distinct from the light of the second wavelength.

In an embodiment of the invention, the fibrescope further comprises a photon detection system for imaging of the light of said first wavelength. In an embodiment of the invention, the photon detection system is preferably a charge coupled device, CCD, or an electron-multiplying charge coupled device, emCCD.

In an embodiment of the invention, the optical filter is one of a band-pass filter, a band-stop filter, a notch filter, a long-pass filter, a short-pass filter, a wedge filter, a tunable filter, a diffraction grating, a diffractive optical element, a dichroic mirror or a dichroic prism.

In an embodiment of the invention, the scintillator comprises a microfilm of microcolumnar thallium-doped Caesium Iodide, CsI:Tl. In an embodiment of the invention, the microfilm of CsI:Tl is preferably between 100 and 150 micrometers thick.

In an embodiment of the invention, the fibrescope according further comprises a filter port for supporting the optical filter; wherein the filter port is arranged to allow the optical filter to be changed.

In an embodiment of the invention, the fibrescope further comprises two lenses arranged to direct light from the second end of the optical system to the photon detection system. In an embodiment of the invention, the two lenses both have an f-number of less than f/1, preferably between f/0.85-f/0.95, most preferably f/0.95. In an embodiment of the invention, the first lens receives light from the second end of the optical system and forms an image at infinity; and the second lens reimages the light at infinity and directs the light onto the photon detection system.

In an embodiment of the invention, the fibrescope further comprises a light-tight material which encloses the optical system, blocking ambient light. In an embodiment of the invention, the light-tight material is preferably neoprene.

In an embodiment of the invention, the fibrescope further comprises an angularly-adjustable detector head.

In an embodiment of the invention, the fibrescope further comprises a light tight box, wherein the light tight box encloses one or more elements of the photon detection system, the optical filter, the filter port and the two lenses.

In an embodiment of the invention, the fibrescope includes a shutter at one end of the optical system, wherein the shutter is arranged to shield the scintillator from exposure to radiation when closed.

In an embodiment of the invention, the scintillator covers only part of the field of view of the optical system. In an embodiment of the invention, the scintillator covers between 90% and 99% of the field of view of the optical system, preferably 95% of the acceptance angle of the optical system.

In a second aspect, a method for imaging radiation sources comprises the steps of: receiving radiation at a scintillator, wherein the scintillator emits light of a first wavelength in response to the radiation; receiving radiation at one or more further elements of the optical system, wherein the one or more further elements emits scintillation light of a second wavelength; and transmitting the light of the first wavelength whilst filtering out the light of the second wavelength at the optical filter. In an embodiment of the invention, the light of the first wavelength is directed onto the photon detection system by the first and second lenses.

In an embodiment of the invention, light passing the optical filter having a wavelength other than the first wavelength, is measured and a representative average is subtracted from the measurement of the light of the first wavelength.

In a third aspect, a fibrescope comprises a first scintillator arranged to produce light of a first wavelength upon exposure to radiation; a second scintillator arranged to produce light of a second wavelength upon exposure to radiation; an optical system arranged to receive and direct light of the first and second wavelengths emitted from the first and second scintillators respectively, the light being received at one end of the optical system, and wherein one or more elements of the optical system emits scintillation light of a third wavelength upon exposure to radiation; and an optical filter, disposed at the other end of the optical system, and arranged to transmit light of one or more of the first and second wavelengths, and block light of the third wavelength; wherein, the first and second scintillators are chosen such that the light of the first wavelength is spectrally distinct from the light of the second wavelength; and wherein the first and second scintillators are chosen such that the light of the first and second wavelength is spectrally distinct from the light of the third wavelength.

In an embodiment of the invention, the fibrescope further comprises a photon detection system for imaging of the light of said first and second wavelengths. In an embodiment of the invention, the photon detection system is preferably a charge coupled device, CCD, or an electron-multiplying charge coupled device, emCCD.

In an embodiment of the invention, the optical filter is one of a band-pass filter, a band-stop filter, a notch filter, a long-pass filter, a short-pass filter, a wedge filter, a tunable filter, a diffraction grating, a diffractive optical element, a dichroic mirror or a dichroic prism.

In an embodiment of the invention, the first scintillator comprises a microfilm of microcolumnar thallium-doped Caesium Iodide, CsI:Tl. In an embodiment of the invention, the microfilm of CsI:Tl is preferably between 100 and 150 micrometers thick. In an embodiment of the invention, the second scintillator is made of cerium-doped lutetium yttrium orthosilicate, LYSO.

In an embodiment of the invention, the fibrescope further comprises a filter port for supporting the optical filter; wherein the filter port is arranged to allow the optical filter to be changed.

In an embodiment of the invention, the fibrescope further comprises two lenses arranged to direct light from the second end of the optical system to the photon detection system. In an embodiment of the invention, the two lenses both have an f-number of less than f/1, preferably between f/0.85-f/0.95, most preferably f/0.9.

In an embodiment of the invention, the first lens receives light from the second end of the optical system and forms an image at infinity; and the second lens reimages the light at infinity and directs the light onto the photon detection system.

In an embodiment of the invention, the fibrescope further comprises a light-tight material which encloses the optical system, blocking ambient light. In an embodiment of the invention, the light-tight material is preferably neoprene.

In an embodiment of the invention, the fibrescope further comprises an angularly-adjustable detector head.

In an embodiment of the invention, the fibrescope further comprises a light tight box, wherein the light tight box encloses one or more of the photon detection system, the optical filter, the filter port and the two lenses.

In an embodiment of the invention, the fibrescope further includes a shutter at one end of the optical system, wherein the shutter is arranged to shield the first and second scintillators from exposure to radiation when closed.

In an embodiment of the invention, the first and second scintillators cover only part of the field of view of the optical system. In an embodiment of the invention, the first and second scintillators cover between 90% and 99% of the field of view of the optical system, preferably 95% of the acceptance angle of the optical system.

In a fourth aspect, a method for imaging radiation sources comprises the steps of: receiving radiation at a first scintillator, wherein the first scintillator emits light of a first wavelength in response to the radiation; receiving radiation at a second scintillator, wherein the second scintillator emits light of a second wavelength in response to the radiation; receiving radiation at one or more further elements of the optical system, wherein the one or more further elements emits scintillation light of a third wavelength; and transmitting the light of one or more of the first and second wavelengths whilst stopping the light of the third wavelength at the optical filter.

In an embodiment of the invention, the light passing the optical filter having a wavelength other than the first or second wavelength, is measured and subtracted from the measurements of the light of the first and second wavelength.

DESCRIPTION OF THE DRAWINGS

Some embodiments of the apparatus and methods, in accordance with embodiments of the present invention are now described, by way of example only, and with reference to the accompanying drawings, in which.

DESCRIPTION OF EMBODIMENTS

Figure 1:
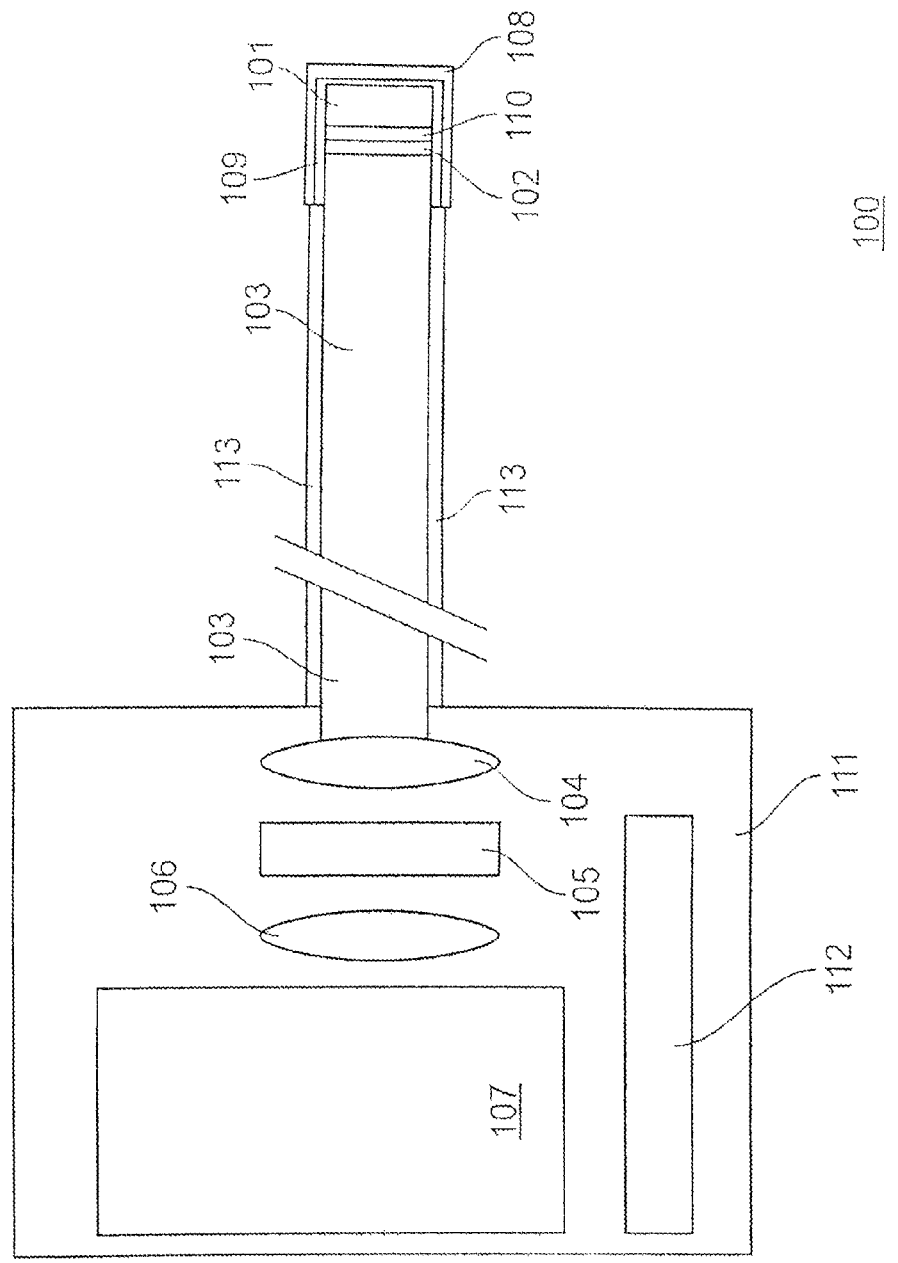
FIG. 1 shows a schematic diagram of a radiation detection system in accordance with an embodiment of the present invention.

A first embodiment of the invention will now be described with reference to FIG. 1. FIG. 1 shows a radiation detection system 100. The radiation detection system 100 has a scintillator 101. The scintillator 101 is sensitive to a first radiation type. Preferably, the scintillator 101 is a microfilm of thallium-doped Caesium Iodide (CsI:Tl). More preferably, for imaging the beta particles from fluorine-18 the microfilm of CsI:Tl is between 100 and 150 micrometers thick. This is the optimum thickness for detecting beta radiation from fluorine-18 whilst minimising interactions with gamma particles. The scintillator may be thicker for radioisotopes with higher beta energy.

The skilled reader will understand that different scintillator materials may be preferable when imaging different radiation sources. The preferred scintillator 101 must have a high light output in response to the incident radiation of interest (high efficacy). Additionally, the preferred scintillator may be selected on the amount of light emitted in a preferred direction and/or wavelength band-shape. Preferably, the scintillator 101 will produce light of a wavelength well matched to the spectral transmission of the fibre optic bundle 103 and the photon detection system 107.

More preferably, the scintillator 101 emits light of a wavelength longer than 500 nm, which allows for easier spectral filtering. Additionally, preferably the scintillator is capable of being produced as a microcolumnar micro-film. Other preferred scintillator materials include BC-404, GAG and yttrium aluminium garnet (YAG). Crystalline scintillators have the advantage of a (relatively) higher yield at the expense of reduced collimation. Alternatively, the scintillator 101 may be a ceramic scintillator. Ceramic scintillators have the advantage that they do not require a fibre optic plate 110 or a protective film 108.

Furthermore, a different scintillator 101 thickness may be preferable when imaging radiation of different energy or type. For example, when imaging high energy β-particles, such as those produced by gallium-68, a thick scintillator 101 is preferable. Likewise, when imaging high energy gamma (x-ray) emission a substantially thicker scintillator 101 would be preferred.

The scintillator 101 is mounted on a fibre optic plate 110. The fibre optic plate 110 may be any material suitable for transmitting light produced in the scintillator 101 to the fibre optic bundle 103. Preferably the fibre optic plate 110 has a high optical transfer efficacy and low optical distortion.

Alternatively, the scintillator 101 may be positioned directly on top of the fibre optic bundle 103, without the need for a fibre optic plate 110. At present, there are significant manufacturing challenges which make such an arrangement difficult.

Advantages of a radiation detection system 100 without a fibre optic plate 110 include: better image resolution since less blur is caused by a stack thickness and divergent light, avoidance of aliasing (moiré) caused by the misalignment and pitch differences of the "pixels" of the faceplate and the fibre optic bundle 103, a slight increase in throughput of light and improved reliability.

The scintillator 101 is shielded from extraneous light by a reflector 109. The reflector 109 is further arranged to ensure that light produced in the scintillator 101 is directed towards the fibre optic bundle 103. Preferably, the reflector 109 is an aluminium foil, but the reflector 109 may be made of any suitable high reflectivity/low transmissivity material.

In high sensitivity applications, a single layered reflector 109 may not sufficiently shield the scintillator 101 from extraneous light. The presence of pinholes in a single layer of 16 μm thick aluminium foil can allow extraneous light to reach the scintillator 101. Therefore, it is preferable that the reflector 109 comprises two or more layers of aluminium foil, since the probability of pinholes aligning across two or more layers of aluminium foil is very small.

The scintillator 101 is also protected from the external environment by a protective film 108. The protective film 108 covers, at least, the scintillator 101 and the reflector 109. Some scintillator materials are hygroscopic and need protecting from extraneous moisture. The protective film 108 blocks moisture from reaching the scintillator 101. The protective film 108 also exhibits good barrier properties to commonly encountered chemicals, such as inorganic and organic media, acids and bases. The protective film 108 is preferably Parylene™. The protective film 108 may however be any material suitable for protecting the scintillator from the expected environment of use.

The combined thickness of the reflector 109 and the protective film 108 is such that the incident radiation of interest is not substantially attenuated. In the present embodiment, the combined thickness of the reflector 109 and the protective film 108 is less than 10 micrometers, such that incident β-particles are not significantly attenuated.

The radiation detection system 100 also includes a spatially coherent (i.e. "imaging") fibre optic bundle 103. The fibre optic bundle 103 is arranged to collect light produced within the scintillator 101 and redirect this light onto the photon detection system 107. Preferably, the fibre optic bundle 103 is a wound fibre optic bundle. Preferably, the fibre optic bundle 103 also has a numerical aperture of at least 0.5, so that light is accepted from as wide a range of angles as possible. More preferably, the fibre optic bundle material is selected to have low scintillation characteristics and a low Cerenkov radiation cross-section. Most preferably, the dimensions of the quality area of the fibre optic bundle are also selected to match the dimensions of the photon collection area of the photon detection system 107; this avoids potential signal losses due to having to magnify/demagnify the image from the scintillator 101. Additionally, the fibre optic bundle 103 material may be doped to further tailor the transmission characteristics. The skilled reader will understand that the optical system could further include one or more lenses, mirrors, or similar to suitably direct the light.

An optical index-matching material 102 is used to aid transmission of light between the fibre optic plate 110 and the fibre optic bundle 103. The optical index-matching material 102 is arranged to minimise optical losses at the interfaces of the fibre optic plate 110 and the fibre optic bundle 103. Such optical losses are due to total internal reflection loss and Fresnel losses. Preferably, the optical index matching material 102 is an index-matching fluid. The optical index-matching material 102 may however be a photonic crystal or any other suitable material. More preferably, the index-matching material 102 is a thin layer (i.e. <10 μm), which minimises the image blur and radiation scintillation, whilst optimising the optical transmission.

Alternatively, the scintillator 101 may be coated directly onto the fibre optic plate 110. In this arrangement, the optical index-matching material 102 may not be necessary.

The radiation detection system 100 also includes a photon detection system 107. Preferably, the photon detection system 107 is an electron multiplying charge couple device (emCCD). With the currently available technology, an emCCD has the optimum balance between sensitivity and resolution for this application. The photon detection system 107 may however use any suitable imaging technology, depending on the required resolution and sensitivity.

Preferably, the dimensions of the scintillator 101, the fibre optic bundle 103 and the photon detection system 107 are the same to avoid magnification/demagnification losses. If the fibre optic bundle 103 is larger than the photon detection system 107, the numerical aperture of the detection system 107 would have to be greater than the fibre bundle 103 (which is not possible with commercially available optics). Similarly, if the fibre optic bundle 103 is smaller than the photon detection system 107 the amount of light collected would be compromised. This is particularly important when using high numerical aperture lenses. For example, a common size for an emCCD chip is 8.2 mm×8.2 mm, so the effective dimension of the scintillator 101 and the fibre optic bundle 103 should also be 8.2 mm×8.2 mm.

The radiation detection system also includes one or more optical filters 105 for wavelength dependent filtering. The optical filter(s) 105 is arranged to direct light of specific wavelengths from the fibre optic bundle 103 onto the detection system 107, whilst blocking light of unwanted wavelengths. Photons produced by radioactive particles interacting with a typical fibre optic bundle have a characteristic wavelength centred on 450 nm. The optical filter 105 is preferably a high-pass filter which allows wavelengths above 500 nm to pass. However, the optical filter 105 may be any suitable optical filter, such as a dichroic prism, a coloured filter, a notch filter or a band-pass filter.

The radiation detection system 100 also includes a first 104 and second 106 lens. The first and second lenses 104 and 106 are counter-facing. The first lens 104 is positioned so that the fibre optic bundle 103 end face is in its focal plane and forms an image of the end face at infinity. The second lens 106 reimages the end face of the fibre optic bundle 106 onto the photon detection system 107. Using counter-facing lenses 104 and 106, requires no modification to the photon detection system 107 whilst providing for efficient light coupling and low vignetting. The light from the fibre optic bundle 103 may however be directed by any other suitable method, such as direct butt coupling, using custom aspheric lenses and/or mirrors, using an array of graded index lenses or using a fused fibre coupler.

The optical filter 105 is preferably positioned between the counter-facing lenses 104 and 106. Between the lenses 104 and 106 is the preferred position for the optical filter 105, since the light is substantially collimated in this region. If the optical filter 105 is a multi-layered interference type filter, then its spectral performance will be compromised if it is used in a position where the beam is divergent. The optical filter 105 may however be positioned between the first lens 104 and the fibre optic bundle 103, or between the second lens 106 and the photon detection system 107. The skilled reader will understand that the optical filter 105 and the counter-facing lenses 104 and 106 may be combined into a single sealed unit.

A light-tight box 111 surrounds the photon detection system 107, the lenses 104 and 106 and the optical filter 105. The light-tight box 111 serves to block ambient light from reaching the photon detection system 107.

The light-tight box 111 also has radiation shielding 112. The radiation shielding 112 is arranged to reduce the incidence of ionising radiation at the photon detection system 107. Preferably, the radiation shielding 112 is lead. However the radiation shielding 112 may be any high density material suitable for reducing or blocking radiation from reaching the photon detection system 107.

The fibre optic bundle 103 is further surrounded by a light shield 113. The light shield 113 reduces the number of photons tunnelling through the typical plastic coating of a fibre optic bundle to acceptable levels. Preferably, the light shield 113 covers the entire length of the fibre optic bundle 103. More preferably, the light shield 113 is neoprene or a heat-shrink plastic. The light shield 113 preferably extends into the light-tight box 111 such that a flexible light-tight seal is formed.

In some applications, it is preferable for the radiation detection system 100 to at least partially be covered by a replaceable sterile covering (not shown). A replaceable sterile covering reduces the need for cleaning. Preferably, the sterile covering covers at least the scintillator 101, the fibre optic plate 110, the protective film 108, the reflector 109, the optical index matching material 102 and at least part of the fibre optic bundle 103. Preferably the sterile covering is a sterile polyurethane film. However, the sterile covering may be any material suitable for sterile medical use, which has low beta particle attenuation.

The skilled reader will appreciate that one or more of the elements of the radiation detection system 100 can be combined into one or more sealed units. For example, the lenses 104 and 106, optical filter 105 and photon detection system 107 are shown separately for clarity and ease of explanation, but may form one sealed unit. The skilled reader will also appreciate that each "lens" may be an assembly of multiple optical elements, in order to provide the desired large numerical aperture and sharp image resolution over the entire field angle and wavelength range.

In this example embodiment, the process for detecting radiation is as follows. The radiation detection system 100 is moved into proximity with a radioactive sample. The sample may be a human tissue sample which has been treated with a radiopharmaceutical such as Flurodeoxyglucose ([$^{18}$F]-FDG). A sample treated with [$^{18}$F]-FDG FDG emits fluorine-18 beta particles and 511 keV gamma particles. Radiation incident upon the radiation detection system 100 passes through the protective film 108 and the reflector 109 to arrive at the scintillator 101. The material and thickness of the scintillator 101 is selected so that it interacts with beta particles but not gamma particles. Preferably, the scintillator 101 is a CsI:Tl microfilm scintillator. Photons produced in a CsI:Tl scintillator have a peak emission wavelength of 550 nm. Beta particles interacting with the scintillator 101 each produce a plurality of photons, with the number of photons produced dependent on the beta particle's energy. Photons emitted from the scintillator 101 are collected by the fibre optic bundle 103, which directs the collected photons to travel along the fibre optic bundle 103.

Photons with a wavelength that matches the pass wavelength of the optical filter 105 are directed onto the photon detection system 107. Photons with wavelengths outside those permitted through by the optical filter 105 are blocked.

Radiation particles, which may or may not have passed through the scintillator 101, arrive at, and interact with, the fibre optic bundle 103. Unwanted noise photons may be produced in the fibre optic bundle 103. Radiation noise is created by unwanted beta and gamma particle interactions with elements of the radiation detection system. Typically the biggest contribution is from gamma particle interactions with the fibre glass in the fibre optic plate 110 and the fibre optic bundle 103. Such interactions produce noise photons through scintillation, Bremsstrahlung and Cerenkov radiation. The materials of the optical elements of the radiation detection system 100 that are vulnerable to radiation noise are selected so that noise photons are spectrally distinct from the scintillation photons produced by the scintillator 101 (e.g. the noise photons have a wavelength of >10 nm away from the scintillation photons). Said noise photons will have a wavelength dependent on the materials used in the fibre optic bundle 103. The materials of the fibre optic bundle 103 are selected such that any photons emitted have a different wavelength to those emitted from the scintillator 101.

Unwanted noise photons, produced within the fibre optic bundle, arriving at the optical filter 105 are blocked from further transmission by the wavelength dependent filter. In this manner, the photon detection system 107 predominantly receives photons produced in the scintillator 101. Any photons with wavelengths different to those produced in the scintillator 101 are screened out by the optical filter 105, greatly improving the signal to noise ratio of the radiation detection system 100.

The skilled person will understand that in some situations it would be preferable to also measure the noise photons. The above described method can further include changing the optical filter 105 such that a different wavelength of light (or band of wavelengths) is allowed to pass. To this end, a tunable filter, diffraction grating, diffractive optical element (DOE) or imaging spectrograph may be used. In this manner any wavelength of light produced in the radiation detection system 100 can be detected and imaged.

One advantage of the above described embodiment is that the photon detection system 107 can use any suitable high sensitivity imaging system, as detection is not limited by temporal resolution or wavelength discrimination. A further advantage of adding additional optical elements to filter out unwanted wavelengths of light, is that any light incident on the detector can be considered the signal of interest, thereby eliminating the need for sophisticated software processing.

A distal shutter (not shown) may be used to isolate the scintillator 101 from any exposure to radiation. In this manner, accurate measurements of unwanted noise photons generated in the fibre optic bundle 103, which pass the optical filter 105, can be taken, in the substantial absence of photons being emitted from the scintillator 101. This (average) noise signal may then be subtracted from the measurements of light produced in the scintillator 101, further improving the signal to noise ratio.

In one variant of the above described embodiment, the scintillator 101 does not cover all of the fibres of the fibre optic bundle 103. Preferably, the scintillator 101 covers between 90% and 99% of the fibres of the fibre optic bundle 103. As will be appreciated, other coverage percentages may be implemented. In this arrangement, continuous and accurate measurements of unwanted noise photons generated in the fibre optic bundle 103, which pass the optical filter 105, may be taken. This noise signal may then be subtracted from the measurements of light produced in the scintillator 101, further improving the signal to noise ratio.

Figure 2:
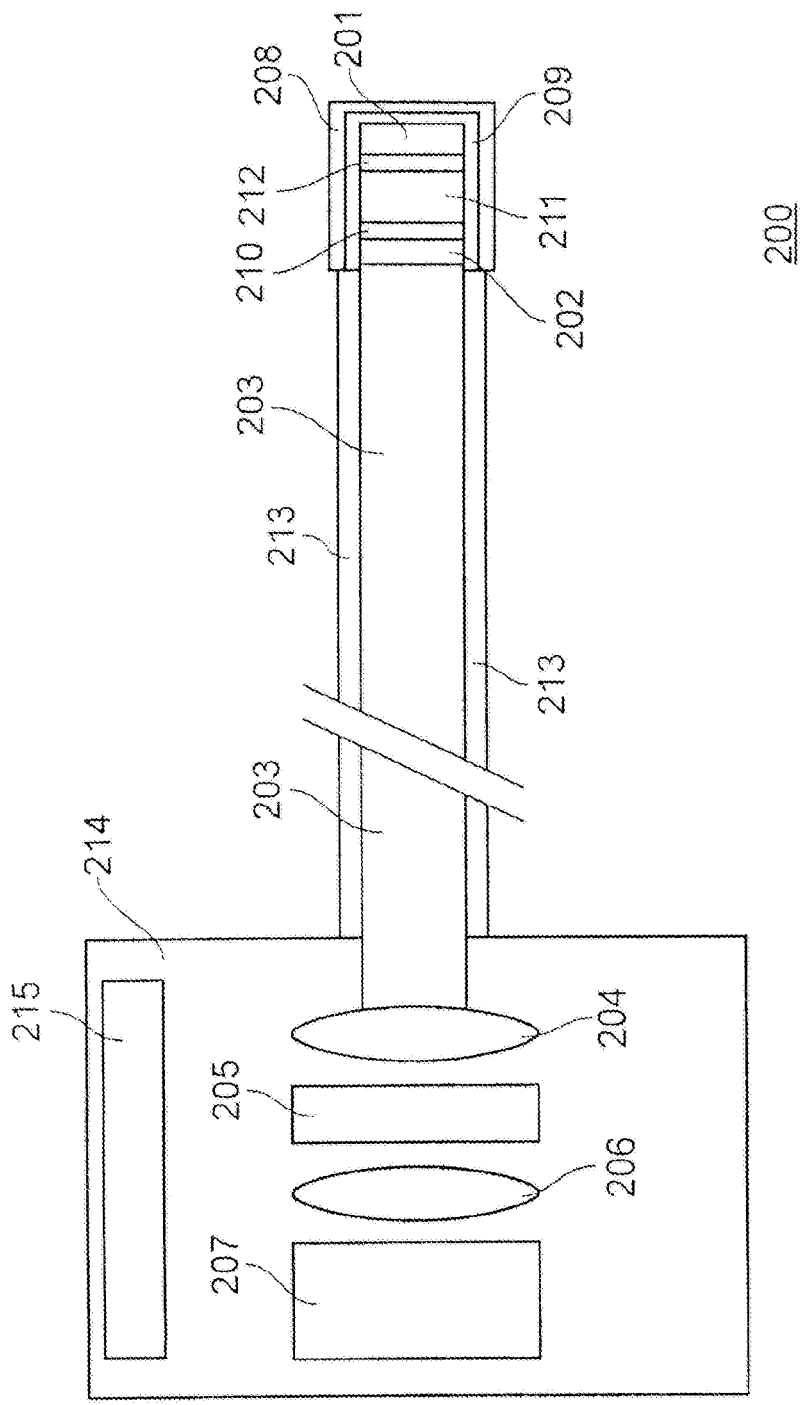
FIG. 2 shows a schematic diagram of a radiation detection system in accordance with a further embodiment of the present invention.

In the above described embodiment a radiation specific scintillator is selected so as to image a single radiation type (or energy) at any one time. Many radioactive sources emit two or more radiation types, and/or radiation at two or more distinct energy levels. Radiation of a different type, or of a different energy, may not interact significantly with the first scintillator 101. Furthermore, the skilled person will understand it may be preferable to be able to image two different (but proximal) radiation sources simultaneously. In a further embodiment, with reference to FIG. 2, the radiation detection system 200 has a second scintillator 211 selected so as to be sensitive to a second radiation type or a second radiation energy.

As in the first embodiment, the radiation detection system 200 has a first scintillator 201. The scintillator 201 is sensitive to a first radiation type. Preferably, the scintillator 201 is a microfilm of microcolumnar thallium-doped Caesium Iodide (CsI:Tl). More preferably, the microfilm of CsI:Tl is between 130 and 150 micrometers thick. This is the optimum thickness for detecting beta radiation from fluorine-18 whilst minimising interactions with gamma particles. The scintillator may be thicker for radioisotopes with higher beta energy.

The radiation detection system 200 also has a second scintillator 211. The second scintillator 211 is sensitive to a second radiation type. Preferably, the second scintillator 211 is a Cerium-doped Lutetium Yttrium Orthosilicate (LYSO) scintillator, as a LYSO scintillator is particularly suited to detecting gamma particles. Even more preferably, the second scintillator 211 material is selected that scintillation photons produced are of a spectrally distinct wavelength to those produced in the first scintillator 201. Photons produced in a LYSO scintillator will have a peak emission wavelength of 428 nm, which is spectrally distinct from those produced in a CsI:Tl scintillator (peak emission wavelength of 550 nm).

The skilled reader will understand that different scintillator materials may be preferable when imaging different radiation sources. The scintillators 201 and 211 may be placed in either order, depending on the application. The preferred scintillators 201 and 211 must have a high light output in response to the incident radiation of interest. Preferably, the scintillators 201 and 211 will produce light of a wavelength well matched to the spectral transmission of the fibre optic bundle 203 and the photon detection system 207. Other preferred scintillator materials include BC-404, GAG, yttrium aluminium garnet (YAG).

Furthermore, different scintillator 201 and 211 thicknesses may be preferable when imaging radiation of different energy or type. For example, when imaging high energy β-particles, such as those produced by gallium-68, a thicker scintillator 201 is preferable. Likewise, when imaging high energy gamma (x-ray) emission a substantially thicker scintillator 211 would be preferred.

The second scintillator 211 is mounted on a fibre optic plate 210. The fibre optic plate 210 may be any material suitable for transmitting light produced in the scintillators 201 and 211 to the fibre optic bundle 203. Preferably the fibre optic plate 210 has a high optical transfer efficiency and low optical distortion.

The scintillators 201 and 211 are shielded from extraneous light by a reflector 209. The reflector 209 is further arranged to ensure that light produced in the scintillators 201 and 211 is directed towards the fibre optic bundle 203. Preferably, the reflector 209 is an aluminium foil, but the reflector 209 may be made of any suitable high reflectivity/low transmissivity material.

The scintillators 201 and 211 are also protected from the external environment by a protective film 208. The protective film 208 covers, at least, the scintillators 201 and 211 and the reflector 209. The protective film 208 blocks moisture from reaching the scintillators 201 and 211. The protective film 208 also exhibits good barrier properties to commonly encountered chemicals, such as inorganic and organic media, acids and bases. The protective film 208 is preferably Parylene™. The protective film 208 may however be any material suitable for protecting the scintillator from the expected environment of use.

The combined thickness of the reflector 209 and the protective film 208 is such that the incident radiation of interest is not substantially attenuated. In the present embodiment, the combined thickness of the reflector 209 and the protective film 208 is less than 10 micrometers, such that incident β and γ particles are not significantly attenuated.

The radiation detection system 200 also includes a spatially coherent "imaging" fibre optic bundle 203. The fibre optic bundle 203 is arranged to direct light produced within the scintillators 201 and 211 onto the photon detection system 207. Preferably, the fibre optic bundle 203 has a numerical aperture of at least 0.5, so that light is accepted from as wide a range of angles as possible. More preferably, the fibre optic bundle material is selected to have low scintillation characteristics and a low Cerenkov radiation cross-section. Most preferably, the dimensions of the quality area of the fibre optic bundle are also selected to match the dimensions of the photon collection area of the photon detection system 207; this avoids signal losses due to having to magnify/demagnify the image from the scintillators 201 and 211. The skilled reader will understand that the optical system could further include one or more lenses, mirrors, or similar to suitably direct the light.

An optical index-matching material 202 is used to aid transmission of light between the fibre optic plate 210 and the fibre optic bundle 203. A second index-matching material 212 is arranged to aid transmission of light from the first scintillator 201 through the second scintillator 211. The optical index-matching materials 202 and 212 are arranged to minimise optical losses at their respective interfaces. Such optical losses are due to total internal reflection loss and Fresnel losses. Preferably, the optical index matching materials 202 and 212 are index-matching fluids. The optical index-matching materials 202 and 212 are selected to be transparent to the wavelengths of light produced by the scintillators 201 and 211. The skilled reader will understand that the optical index-matching materials 202 and 212 may be different materials to each other. The optical index-matching materials 202 and 212 may also be photonic crystals or any other suitable material.

The radiation detection system 200 also includes a photon detection system 207. Preferably, the photon detection system 207 is an electron multiplying charge couple device (emCCD). An emCCD has the optimum balance between sensitivity and resolution for this application. The photon detection system 207 may however use any suitable imaging technology, depending on the required resolution and sensitivity.

Preferably, the dimensions of the scintillators 201 and 211, the fibre optic bundle 203 and the photon detection system 207 are the same to avoid magnification/demagnification losses. For example, a common size for an emCCD chip is 8.2 mm×8.2 mm, so the effective dimension of the scintillators 201 and 211 and the fibre optic bundle 203 should also be 8.2 mm×8.2 mm.

The radiation detection system 200 also includes one or more optical filters 205 for wavelength dependent filtering. The optical filter(s) 205 is arranged to direct light of specific wavelengths from the fibre optic bundle 203 onto the detection system 207, whilst blocking light of unwanted wavelengths. Photons produced by radioactive particles interacting with a typical fibre optic bundle have a characteristic wavelength centred on 450 nm. The optical filter 205 is preferably a notch filter centred on 450 nm. A notch filter only stops wavelengths of light in a narrow band, letting past light of wavelengths both above and below the stop wavelengths. However, the optical filter 205 may be any suitable optical filter, such as a dichroic prism or a band-pass filter.

The radiation detection system 200 also includes a first 204 and second 206 lens. The first and second lenses 204 and 206 are counter-facing. The first lens 204 is positioned so that the fibre optic bundle 203 end face is in its focal plane and forms an image of the end face at infinity. The second lens 206 reimages the end face of the fibre optic bundle 206 onto the photon detection system 207. Using counter-facing lenses 204 and 206, requires no modification to the photon detection system 207 whilst providing for efficient light coupling and low vignetting. The light from the fibre optic bundle 203 may however be directed by any other suitable method, such as direct butt coupling, using custom aspheric lenses, using an array of graded index lenses or using a fused fibre coupler.

The optical filter 205 is preferably positioned between the counter-facing lenses 204 and 206. The optical filter 205 may however be positioned between the first lens 204 and the fibre optic bundle 203, or between the second lens 206 and the photon detection system 207. The skilled reader will understand that the optical filter 205 and the counter-facing lenses 204 and 206 may be combined into a single sealed unit.

A light-tight box 214 surrounds the photon detection system 207, the lenses 204 and 206 and the optical filter 205. The light-tight box 214 serves to block ambient light from reaching the photon detection system 207.

The light-tight box 214 also has radiation shielding 215. The radiation shielding 215 is arranged to reduce the incidence of ionising radiation at the photon detection system 207 and the optical elements 204, 205 and 206. Preferably, the radiation shielding 215 is lead. However the radiation shielding 215 may be any high density material suitable for reducing or blocking radiation from reaching the photon detection system 207 and the optical elements 204, 205 and 206.

The fibre optic bundle 203 is further surrounded by a light shield 213. The light shield 213 reduces the number of photons tunnelling through the typical plastic coating of a fibre optic bundle to acceptable levels. Preferably, the light shield 213 covers the entire length of the fibre optic bundle 103. Preferably, the light shield 213 is neoprene or a heat-shrink plastic.

In some applications, it is preferable for the radiation detection system 200 to at least partially be covered by a replaceable sterile covering (not shown). A replaceable sterile covering reduces the need for cleaning. Preferably, the sterile covering covers at least the scintillators 201 and 211, the fibre optic plate 210, the protective film 208, the reflector 209, the optical index matching materials 202 and 212 and at least part of the fibre optic bundle 203. Preferably the sterile covering is a sterile polyurethane film. However, the sterile covering may be any material suitable for sterile medical use.

The skilled reader will appreciate that one or more of the elements of the radiation detection system 200 can be combined into one or more sealed units. For example, the lenses 204 and 206, optical filter 205 and photon detection system 207 are shown separately for clarity and ease of explanation, but may form one sealed unit.

In this example embodiment, the process for detecting radiation is as follows. The scintillators 201 and 211 are moved into proximity with a sample emitting multiple forms of radiation. Radiation incident upon the radiation detection system 200 passes through the protective film 208 and the reflector 209 to arrive at the first scintillator 201. The material and thickness of the scintillator 201 is selected so that it interacts with beta particles but not gamma particles. Preferably, the scintillator 201 is a CsI:Tl microfilm scintillator. Photons produced in a CsI:Tl scintillator have a peak emission wavelength of 550 nm. Beta particles interacting with the scintillator 201 each produce a plurality of photons, with the number of photons produced dependent on the beta particle's energy. Photons emitted from the scintillator 201 are directed into the fibre optic bundle 203.

Radiation of a second type, passes through the first scintillator 201 without substantially interacting with the first scintillator 201, and arrives at the second scintillator 211. The material and thickness of the scintillator 211 is selected so that it interacts with gamma particles. The materials of the second scintillator 211 are also selected such that any photons emitted have a different wavelength to those emitted from the first scintillator 201. Preferably, the second scintillator 211 is a LYSO scintillator. Photons produced in a LYSO scintillator have a peak emission wavelength of 428 nm. Photons emitted from the second scintillator 211 are directed into the fibre optic bundle 203.

Radiation, which may or may not have passed through the scintillators 201 and 211, arrives at, and interacts with, the fibre optic bundle 203. Unwanted noise photons may be produced in the fibre optic bundle 203. Radiation noise is created by unwanted beta and gamma particle interactions with elements of the radiation detection system 200. Typically the biggest contribution is from gamma particle interactions with the fibre glass in the fibre optic plate 210 and the fibre optic bundle 203. Such interactions produce noise photons through scintillation, Bremsstrahlung and Cerenkov radiation. The materials of the optical elements of the radiation detection system 200 vulnerable to radiation noise are selected so that noise photons have a wavelength >10 nm away from the scintillation photons. Said noise photons will have a wavelength dependent on the materials used in the fibre optic bundle 203, typically centred on 450 nm. The materials of the fibre optic bundle 203 are selected such that any photons emitted have a different wavelength to those emitted from the scintillators 201 and 211.

Photons with wavelengths that matches the pass wavelength(s) of the optical filter 205 are directed onto the photon detection system 207. Photons with wavelengths outside those permitted through by the optical filter 205 are blocked from further transmission by the optical filter 205. In this manner, the photon detection system 207 predominantly receives photons produced in the scintillators 201 and 211. Any photons with wavelengths different to those produced in the scintillators 201 and 211 can be screened out by the optical filter 205, greatly improving the signal to noise ratio of the radiation detection system 200.

The skilled person will understand that the optical filter 205 can be further selected to optimise the system for any particular wavelength(s) of interest. In very low light applications it may be preferable to image each wavelength separately with a high sensitivity electron multiplying charge coupled device (emCCD).

In some applications it may be preferable to measure the intensity of the noise photons produced within the radiation systems 100 and 200. For example, the fibre optic bundles 103 and 203 could be considered to be a second or third scintillator in the radiation systems 100 and 200 respectively.

A distal shutter (not shown) may be used to isolate the scintillators 201 and 211 from further exposure to radiation. In this manner, accurate measurements of unwanted noise photons passing the optical filter 205 can be taken. This noise signal may then be subtracted from the measurements of light produced in the scintillators 201 and 211, further improving the signal to noise ratio.

In one variant of the above described embodiment, the scintillators 201 and 211 do not cover all of the fibres of the fibre optic bundle 203. Preferably, the scintillators 201 and 211 cover between 90% and 99% of the fibres of the fibre optic bundle 203. The scintillators 201 and 211 are arranged such that they both do not cover the same fibres of the fibre optic bundle 203. In this arrangement, continuous and accurate measurements of unwanted noise photons passing the optical filter 205 may be taken. This noise signal may then be subtracted from the measurements of light produced in the scintillators 201 and 211, further improving the signal to noise ratio.

Figure 3:
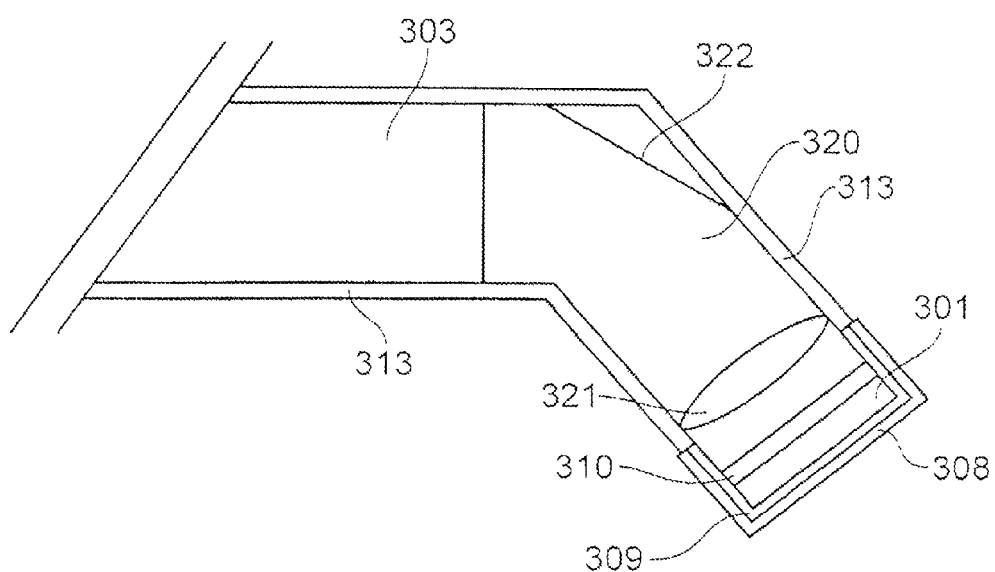
FIG. 3 shows a schematic diagram of a radiation detection system in accordance with a further embodiment of the present invention.

A further embodiment will now be described with reference to FIG. 3. In some applications, for example laparoscopic surgery, it is preferable to have an angled detector head. In laparoscopic surgery, an angled detector head would allow for easier viewing of the sides of the surgical cavity. FIG. 3 is a schematic diagram showing a schematic representation of a further detector head arrangement. To aid clarity, only the fibrescope detector head is shown; the skilled person will understand that the complete fibrescope system would include all of the other elements shown in the previous embodiments. Furthermore, the skilled person would also understand that this embodiment can equally be applied to the dual scintillator arrangement described in the second embodiment, with the addition of a second scintillator separated from the first scintillator by an optical index matching material.

The radiation detection system 300 has a scintillator 301. The scintillator 301 is sensitive to a first radiation type. Preferably, the scintillator 301 is a microfilm of thallium-doped Caesium Iodide (CsI:Tl). More preferably, for imaging the beta particles from fluorine-18 the microfilm of CsI:Tl is between 100 and 150 micrometers thick. This is the optimum thickness for detecting beta radiation from fluorine-18 whilst minimising interactions with gamma particles. The scintillator may be thicker for radioisotopes with higher beta energy.

The skilled reader will understand that different scintillator materials may be preferable when imaging different radiation sources. The preferred scintillator 301 must have a high light output in response to the incident radiation of interest.

Preferably, the scintillator 301 will produce light of a wavelength well matched to the spectral transmission of the fibre optic bundle 303 and the photon detection system (not shown). More preferably, the scintillator 301 emits light of a wavelength longer than 500 nm, which allows for easier spectral filtering. Additionally, preferably the scintillator is capable of being produced as a microcolumnar micro-film. Other preferred scintillator materials include BC-404, GAG and yttrium aluminium garnet (YAG).

Furthermore, a different scintillator 301 thickness may be preferable when imaging radiation of different energy or type. For example, when imaging high energy β-particles, such as those produced by gallium-68, a thick scintillator 301 is preferable. Likewise, when imaging high energy gamma (x-ray) emission a substantially thicker scintillator 301 would be preferred.

The scintillator 301 is shielded from extraneous light by a reflector 309. The reflector 309 is further arranged to ensure that light produced in the scintillator 301 is directed towards the fibre optic bundle 303. Preferably, the reflector 309 is an aluminium foil, but the reflector 309 may be made of any suitable high reflectivity/low transmissivity material.

The scintillator 301 is also protected from the external environment by a protective film 308. The protective film 308 covers, at least, the scintillator 301 and the reflector 309. Some scintillator materials are hygroscopic and need protecting from extraneous moisture. The protective film 308 blocks moisture from reaching the scintillator 301. The protective film 308 also exhibits good barrier properties to commonly encountered chemicals, such as inorganic and organic media, acids and bases. The protective film 308 is preferably Parylene™. The protective film 308 may however be any material suitable for protecting the scintillator from the expected environment of use.

The combined thickness of the reflector 309 and the protective film 308 is such that the incident radiation of interest is not substantially attenuated. In the present embodiment, the combined thickness of the reflector 309 and the protective film 308 is less than 10 micrometers, such that incident β-particles are not significantly attenuated.

The radiation detection system 300 includes an adjustable detector head 320. The adjustable detector head 320 can be adjusted relative to the fibre optic bundle 303. An adjustable detector head increases the viewing angle of the detector head 320 whilst minimising the movement of the radiation detection system 300. The adjustable detector head 320 may be remotely adjusted or manually adjusted. Adjustable detector heads for fibre optic systems are well known in the art, so will their operation will and design will not be described in detail.

The radiation detection system 300 also has a fibre optic plate 310, which is mounted on the scintillator 301. The fibre optic plate 310 may be any material suitable for transmitting light produced in the scintillator 301 to the fibre optic bundle 303. Preferably the fibre optic plate 310 has a high optical transfer efficiency and low optical distortion. More preferably, the fibre optic plate 310 accepts light from a wide range of angles. Alternatively, the fibre optic plate 310 may be replaced with a longer fused-fibre arrangement (essentially making a long fibre optic plate), that is bent to the required angle during manufacture.

The adjustable detector head 320 contains within it a first optical system 321. The first optical system 321 is arranged to direct and focus light emitted from the scintillator 301, which has passed through the fibre optic plate 310, towards the second optical system 322. Preferably, the first optical system 321 is one or more lenses, but may be any suitable optical element such as a prism. If the first optical system 321 is equidistant between the fibre optic plate 310 and the fibre optic bundle 303, the first optical system 321 will act as a 1:1 imaging system. If the first optical system 321 is moved with respect to the fibre optic plate 310 and the fibre optic bundle 303, the first optical system will act as an adjustable "zoom" lens.

The adjustable detector head 320 also includes a second optical system 322. The second optical system 322 is arranged to redirect light from the first optical system 321 towards the fibre optic bundle 303. The second optical system 322 must be able to accept light from all angles of all orientations of the detector head 320. Preferably, the second optical system 322 is a mirror, or series of mirrors. The second optical system 322 may however be any suitable arrangement of optical elements.

The radiation detection system 300 also includes a spatially coherent "imaging" fibre optic bundle 303. The fibre optic bundle 303 is arranged to direct light produced within the scintillator 301 onto the photon detection system (not shown). Preferably, the fibre optic bundle 303 is a wound fibre optic bundle. Preferably, the fibre optic bundle 303 also has a numerical aperture of at least 0.5, so that light is accepted from as wide a range of angles as possible. More preferably, the fibre optic bundle material is selected to have low scintillation characteristics and a low Cerenkov radiation cross-section. Most preferably, the dimensions of the quality area of the fibre optic bundle are also selected to match the dimensions of the photon collection area of the photon detection system (not shown); this avoids signal losses due to having to magnify/demagnify the image from the scintillator 301. The skilled reader will understand that the optical system could further include one or more lenses, mirrors, or similar to suitably direct the light.

The fibre optic bundle 303 and the detector head 320 are further surrounded by a light shield 313. The light shield 313 reduces the number of photons tunnelling through the typical plastic coating of a fibre optic bundle to acceptable levels. Preferably, the light shield 313 covers the entire length of the fibre optic bundle 303; and the length of the detector head 320 up to the start of the protective film and reflector 308 and 309. Preferably, the light shield 313 is neoprene or a heat-shrink plastic.

In this example embodiment, the method of detecting radiation is as follows. The detector head 320 is set to a first angle relative to the fibre optic bundle 303. The detector head 320 can be freely adjusted between a wide range of angles. The detector head 320 may be adjusted to a pre-set angle before use or adjusted (and/or further adjusted) during operation. The radiation detection system 300 is then moved into proximity with a radioactive sample. The sample may be a human tissue sample which has been treated with a radiopharmaceutical such as Flurodeoxyglucose ([$^{18}$F]-FDG). A sample treated with [$^{18}$F]-FDG emits fluorine-18 beta particles and 511 keV gamma particles.

Radiation incident upon the radiation detection system 300 passes through the protective film 308 and the reflector 309 to arrive at the scintillator 301. The material and thickness of the scintillator 301 is selected so that it interacts with beta particles but not gamma particles. Preferably, the scintillator 301 is a CsI:Tl microfilm scintillator. Photons produced in a CsI:Tl scintillator have a peak emission wavelength of 550 nm. Beta particles interacting with the scintillator 301 each produce a plurality of photons, with the number of photons produced dependent on the beta particle's energy. Photons emitted from the scintillator 301 are directed into the fibre optic bundle 303 by the first and second optical systems 321 and 322.

Photons with a wavelength that matches the pass wavelength of the optical filter (not shown) are directed onto the photon detection system (not shown). Photons with wavelengths outside those permitted through by the optical filter are blocked.

Radiation, which may or may not have passed through the scintillator 301, arrives at, and interacts with, the optical elements 321 and 322, the fibre optic plate 310 and the fibre optic bundle 303. Unwanted noise photons may be produced in any of the optical elements 321 and 322, the fibre optic plate 310 and/or the fibre optic bundle 303. Radiation noise is created by unwanted beta and gamma particle interactions with elements of the radiation detection system. Typically the biggest contribution is from gamma particle interactions with the fibre glass in the fibre optic plate 310 and the fibre optic bundle 303. Such interactions produce noise photons through scintillation, Bremsstrahlung and Cerenkov radiation. The materials of the optical elements of the radiation detection system 300 that are vulnerable to radiation noise are selected so that, for example, noise photons have a wavelength >10 nm away from the scintillation photons. Said noise photons will have a wavelength dependent on the materials used in the optical element they are emitted from. In particular, the materials of the fibre optic bundle 303 are selected such that any photons emitted have a different wavelength to those emitted from the scintillator 301.

Unwanted noise photons, produced within the fibre optic bundle, arriving at the optical filter (not shown) are blocked from further transmission by the wavelength dependent filter. In this manner, the photon detection system (not shown) predominantly only receives photons produced in the scintillator 301. Any photons with wavelengths different to those produced in the scintillator 301 are screened out by the optical filter, greatly improving the signal to noise ratio of the radiation detection system 300.

The skilled person will understand that in some situations it would be preferable to also measure the noise photons. The above described method can further include changing the optical filter such that a different wavelength of light is allowed to pass.

In this manner any wavelength of light produced in the radiation detection system 300 can be detected and imaged.

One advantage of the above described embodiment is that the detector head 320 can be manipulated in isolation to the radiation detection system 300. This is particularly advantageous in laparoscopic surgical applications, where the radiation detection system 300 can be used to easily image the sides of the body cavity whilst minimising the stress on the surgical incision.

Figure 4:
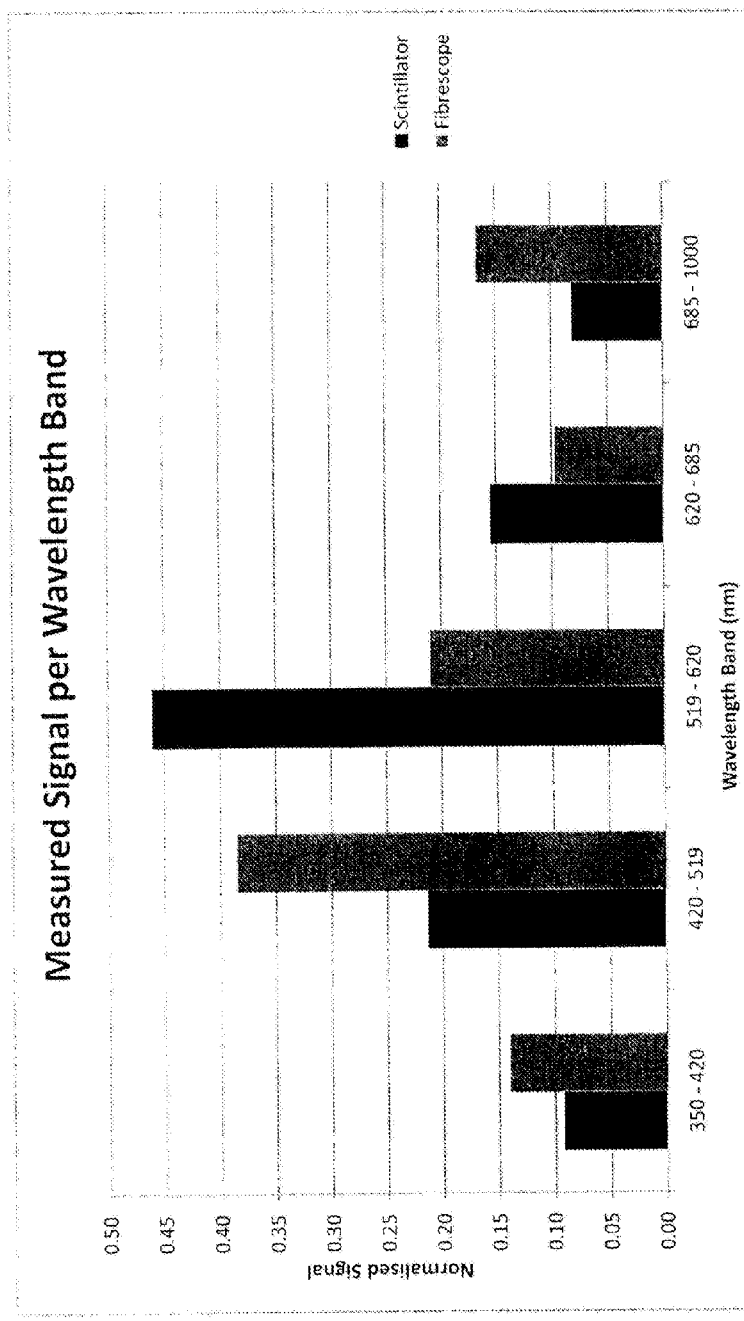
FIG. 4 shows a graph of the signal measured from an exemplary fibrescope according to the present invention.

FIG. 4 shows a graph of the signal measured from an exemplary fibrescope according to the present invention, measured in a clinically relevant scenario. The scintillator emission was excited by the beta and gamma particles emitted from a 200 kBq open well of [$^{18}$F]-FDG. The fibrescope emission was excited by the gamma particles emitted from a 28 MBq vial of [$^{18}$F]-FDG. The fibrescope emission was measured in the absence of the scintillator, but with the otherwise complete fibrescope, according to the present invention.

The emission from the scintillator and fibrescope was measured using an emCCD, as commercially available spectrometers were found not to be sensitive enough to detect the low levels of light emission. The emCCD that was used is sensitive to light with wavelengths between 350 nm and 1000 nm. Therefore, the emCCD effectively cut off any light with wavelengths below 350 nm and above 1000 nm.

Light emitted from the scintillator and the fibrescope (without the scintillator) was measured by the emCCD once it had passed through one of four long pass filters. The four long pass filters had cut-off wavelengths of 420 nm, 519 nm, 620 nm and 685 nm. The signals measured from each of the other filters are then subtracted from the filter of interest. Therefore, the measured light is separated into five distinct wavelength bands:

1—Light with wavelengths between 350 nm and 420 nm;
2—Light with wavelengths between 420 nm and 519 nm;
3—Light with wavelengths between 519 nm and 620 nm;
4—Light with wavelengths between 620 nm and 685 nm; and
5—Light with wavelengths between 685 nm and 1000 nm.

FIG. 4 shows that there is a distinct spectral separation between the light emitted from the scintillator and the light emitted from the rest of the fibrescope system. Therefore, it is possible to filter out the fibrescope emissions, greatly increasing the signal to noise ratio of the resultant image. The skilled person will appreciate that if the optical elements of the radiation detection system are chosen such that their scintillation emission wavelengths are further away from the emission wavelengths of the scintillator, the signal to noise ratio may be increased further still.

Figure 5:
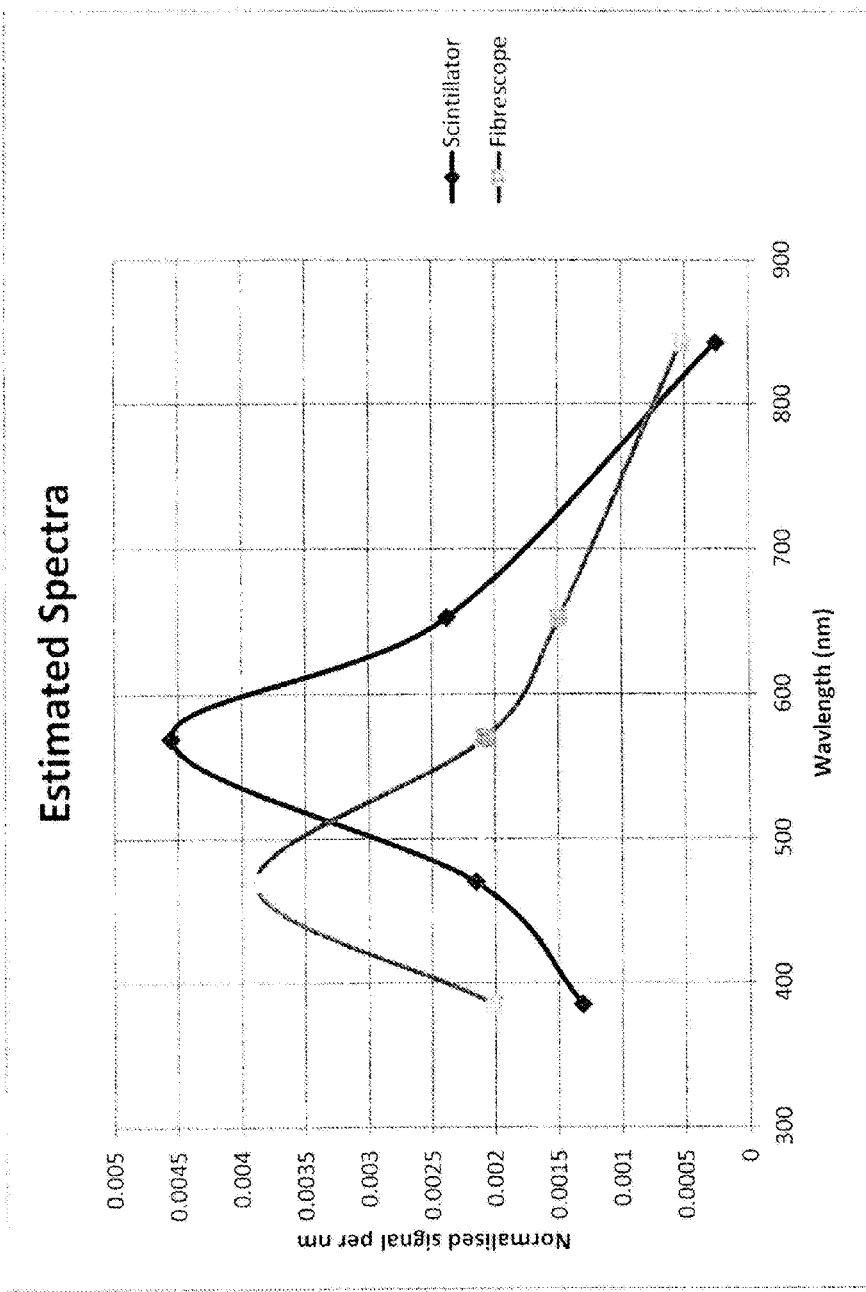
FIG. 5 shows a graph of the estimated emission spectra of the exemplary fibrescope according to the present invention.

To further illustrate the spectral separation shown in FIG. 4, emission spectra for the above wavelengths bands have been plotted in FIG. 5. FIG. 5 shows the normalised signal (per nm) for each wavelength band, plotted against the midpoint wavelength of each band. The curves are plotted by interpolation between each data point. FIG. 5 shows a clear separation between the light emitted from the scintillator and the light emitted from the rest of the fibrescope system.

The invention claimed is:

1. A fibrescope comprising:
   a scintillator arranged to produce light of a first wavelength upon exposure to radiation;
   an optical system arranged to receive and direct light of the first wavelength emitted from the scintillator, the light being received at one end of the optical system, and wherein one or more elements of the optical system emits scintillation light of a second wavelength upon exposure to radiation; and
   an optical filter, disposed at the other end of the optical system, and arranged to transmit light of the first wavelength and block light of the second wavelength;
   wherein, the scintillator is chosen such that the light of the first wavelength is spectrally distinct from the light of the second wavelength,
   wherein the scintillator covers only part of the field of view of the optical system.

2. A fibrescope according to claim 1, further comprising a photon detection system for imaging of the light of said first wavelength.

3. A fibrescope according to claim 2, wherein the photon detection system is one of a charge coupled device, CCD, or an electron-multiplying charge coupled device, emCCD.

4. A fibrescope according to claim 2, further comprising two lenses arranged to direct light from the second end of the optical system to the photon detection system.

5. A fibrescope according to claim 4, wherein the two lenses both have an f-number of less than f/1.

6. A fibrescope according to claim 4, wherein the first lens receives light from the second end of the optical system and forms an image at infinity; and
   the second lens reimages the light at infinity and directs the light onto the photon detection system.

7. A fibrescope according to claim 1, wherein the optical filter is one of a band pass filter, a band-stop filter, a notch filter, a long-pass filter, a short-pass filter, a wedge filter, a tuneable filter, a diffraction grating, a diffractive optical element, a dichroic mirror or a dichroic prism.

8. A fibrescope according to claim 1, wherein the scintillator comprises a microfilm of microcolumnar thallium-doped Caesium Iodide, CsI:Tl.

9. A fibrescope according to claim 8, wherein the microfilm of CsI:Tl is preferably between 100 and 150 micrometers thick.

10. A fibrescope according to claim 1, further comprising a filter port for supporting the optical filter; wherein the filter port is arranged to allow the optical filter to be changed.

11. A fibrescope according to claim 1, further comprising a light-tight material which encloses the optical system, blocking ambient light.

12. A fibrescope according to claim 11, wherein the light-tight material is neoprene.

13. A fibrescope according to claim 1, further comprising an angularly-adjustable detector head.

14. A fibrescope according to claim 1, further comprising a light tight box, wherein the light tight box encloses one or more elements of the photon detection system, the optical filter, the filter port and the two lenses.

15. A fibrescope according to claim 1, further including a shutter at one end of the optical system, wherein the shutter is arranged to shield the scintillator from exposure to radiation when closed.

16. A fibrescope according to claim 1, wherein the scintillator covers between 90% and 99% of the field of view of the optical system.

17. A method for imaging radiation sources, wherein the method comprises the steps of:
receiving radiation at a scintillator, wherein the scintillator emits light of a first wavelength in response to the radiation;
receiving radiation at one or more further elements of the optical system, wherein the one or more further elements emits scintillation light of a second wavelength; and
transmitting the light of the first wavelength whilst filtering out the light of the second wavelength at the optical filter,
wherein light passing the optical filter having a wavelength other than the first wavelength, is measured and a representative average is subtracted from the measurement of the light of the first wavelength.

18. A method according to claim 17, wherein the light of the first wavelength is directed onto the photon detection system by the first and second lenses.

19. A fibrescope comprising:
a first scintillator arranged to produce light of a first wavelength upon exposure to radiation;
a second scintillator arranged to produce light of a second wavelength upon exposure to radiation;
an optical system arranged to receive and direct light of the first and second wavelengths emitted from the first and second scintillators respectively, the light being received at one end of the optical system, and wherein one or more elements of the optical system emits scintillation light of a third wavelength upon exposure to radiation; and
an optical filter, disposed at the other end of the optical system, and arranged to transmit light of one or more of the first and second wavelengths, and block light of the third wavelength;
wherein, the first and second scintillators are chosen such that the light of the first wavelength is spectrally distinct from the light of the second wavelength; and
wherein the first and second scintillators are chosen such that the light of the first and second wavelength is spectrally distinct from the light of the third wavelength.

20. A fibrescope according to claim 19, further comprising a photon detection system for imaging of the light of said first and second wavelengths.

21. A fibrescope according to claim 19, wherein the photon detection system is one of a charge coupled device, CCD, or an electron-multiplying charge coupled device, emCCD.

22. A fibrescope according to claim 19, wherein the optical filter is one of a band-pass filter, a band-stop filter, a notch filter, a long-pass filter, a short-pass filter, a wedge filter, a tuneable filter, a diffraction grating, a diffractive optical element, a dichroic mirror or a dichroic prism.

23. A fibrescope according to claim 19, wherein the first scintillator comprises a microfilm of microcolumnar thallium-doped Caesium Iodide, CsI:Tl.

24. A fibrescope according to claim 23, wherein the microfilm of CsI:Tl is preferably between 100 and 150 micrometers thick.

25. A fibrescope according to claim 19, wherein the second scintillator is made of cerium-doped lutetium yttrium orthosilicate, LYSO.

26. A fibrescope according to claim 19, further comprising a filter port for supporting the optical filter; wherein the filter port is arranged to allow the optical filter to be changed.

27. A fibrescope according to claim 19, further comprising two lenses arranged to direct light from the second end of the optical system to the photon detection system.

28. A fibrescope according to claim 27, wherein the two lenses both have an f-number of less than f/1.

29. A fibrescope according to claim 27, wherein the first lens receives light from the second end of the optical system and forms an image at infinity; and
the second lens reimages the light at infinity and directs the light onto the photon detection system.

30. A fibrescope according to claim 19, further comprising a light-tight material which encloses the optical system, blocking ambient light.

31. A fibrescope according to claim 30, wherein the light-tight material is neoprene.

32. A fibrescope according to claim 19, further comprising an angularly-adjustable detector head.

33. A fibrescope according to claim 19, further comprising a light tight box, wherein the light tight box encloses one or more of the photon detection system, the optical filter, the filter port and the two lenses.

34. A fibrescope according to claim 19, further including a shutter at one end of the optical system, wherein the shutter is arranged to shield the first and second scintillators from exposure to radiation when closed.

35. A fibrescope according to claim 19, wherein the first and second scintillators cover only part of the field of view of the optical system.

36. A fibrescope according to claim 35, wherein the first and second scintillators cover between 90% and 99% of the field of view of the optical system.

37. A method for imaging radiation sources, wherein the method comprises the steps of:
receiving radiation at a first scintillator, wherein the first scintillator emits light of a first wavelength in response to the radiation;
receiving radiation at a second scintillator, wherein the second scintillator emits light of a second wavelength in response to the radiation;
receiving radiation at one or more further elements of the optical system, wherein the one or more further elements emits scintillation light of a third wavelength; and
transmitting the light of one or more of the first and second wavelengths whilst stopping the light of the third wavelength at the optical filter.

38. A method according to claim 37, wherein light passing the optical filter having a wavelength other than the first or second wavelength, is measured and subtracted from the measurements of the light of the first and second wavelength.

\* \* \* \* \*